(No Model.)  A. & A. ISKE.  2 Sheets—Sheet 1.
FARM GATE.

No. 262,425.  Patented Aug. 8, 1882.

Witnesses.
Robert Everett.
Edward G. Siggers.

Inventors:
Anthony Iske
& Albert Iske
By Wm H Babcock
Atty.

(No Model.) 2 Sheets—Sheet 2.
A. & A. ISKE.
FARM GATE.
No. 262,425. Patented Aug. 8, 1882.
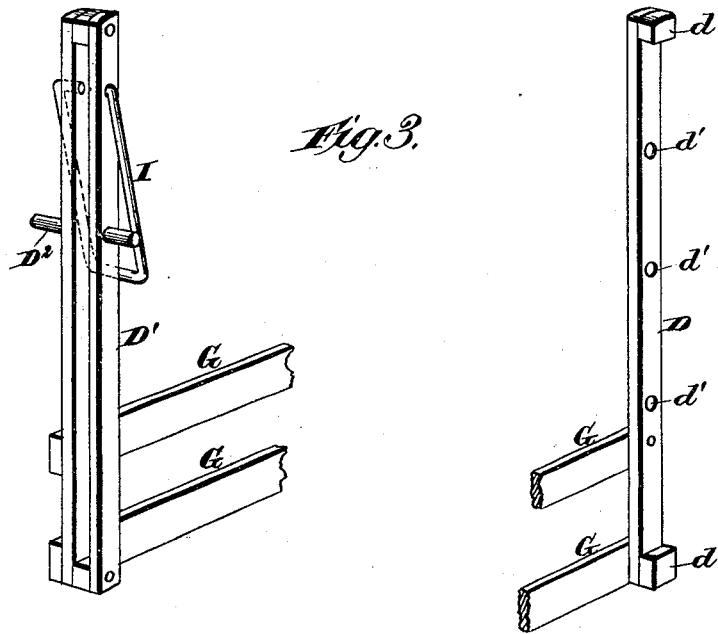
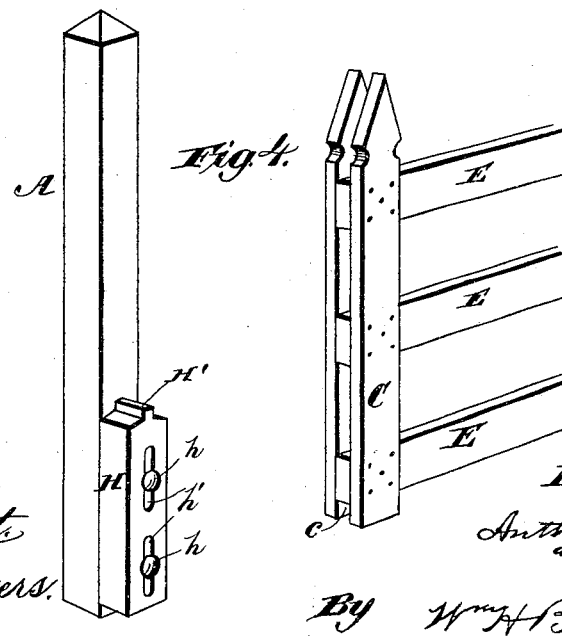
Witnesses,
Robert Everett.
Edw. G. Siggers.
Inventors:
Anthony Iske
and Albert Iske
By Wm H Babcock
Atty.

UNITED STATES PATENT OFFICE.

ANTHONY ISKE AND ALBERT ISKE, OF LANCASTER, PA., ASSIGNORS OF ONE-THIRD TO ROBERT M. SLAYMAKER, OF SAME PLACE.

FARM-GATE.

SPECIFICATION forming part of Letters Patent No. 262,425, dated August 8, 1882.

Application filed June 14, 1882. (No model.)

*To all whom it may concern:*

Be it known that we, ANTHONY ISKE and ALBERT ISKE, citizens of the United States, residing at Lancaster, in the county of Lancaster and State of Pennsylvania, have invented certain new and useful Improvements in Farm-Gates; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of farm-gates in which the whole or a part of the gate is arranged to be lifted in order to avoid drifted snow or inequalities of the ground or to allow the passage of small stock beneath it.

The nature of said invention consists in the construction and combination of devices for raising and lowering as stated and for fastening the gate in its different positions.

Figure 1:
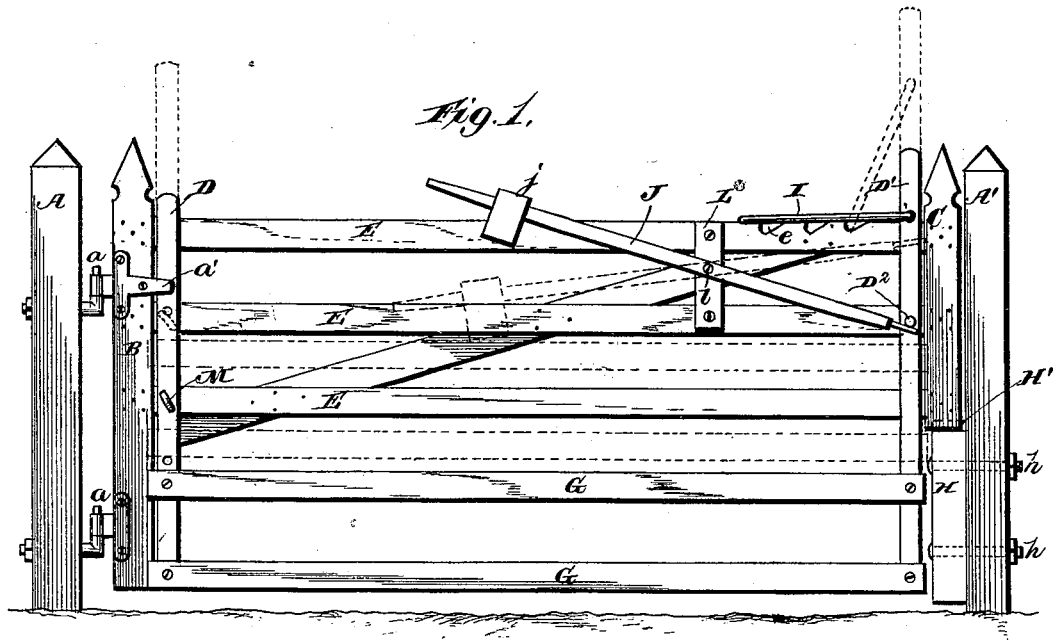
Figure 2:
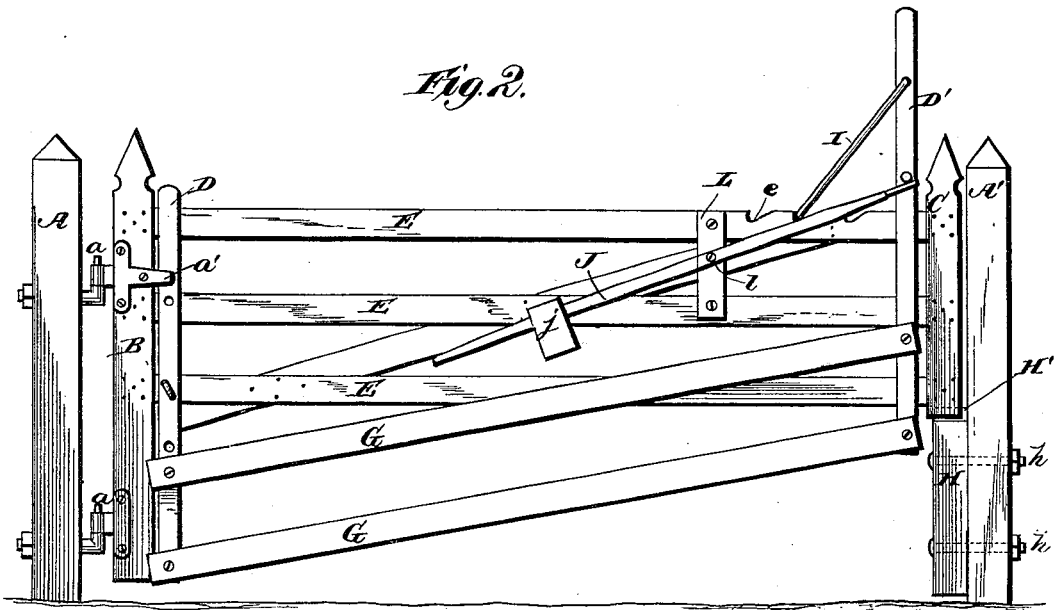

In the accompanying drawings, Figure 1 represents a front view of the gate with both ends lowered, the position of the gate with both ends raised being indicated by dotted lines. Fig. 2 represents a similar view of the gate with the front end raised and the rear end down. Fig. 3 represents a detail view of the two vertically-movable standards; and Fig. 4 represents a detail view of the adjustable block and the part of the fence resting thereon.

A A' designate the two gate-posts, and $a$ the hinges whereby the gate is hung to one of them. These hinges have their forward straps attached to the rear upright bar, B, of the gate, and the upper strap has a tongue, $a'$, projecting alongside of a vertically-movable standard, D, hereinafter described, for the purpose of guiding and bracing the latter.

The gate consists of two parts, one being vertically movable and the other vertically immovable. The latter part consists of the rear upright bar, B, aforesaid, the front upright bar, C, and the connecting horizontal slats or rails E. These slats, as well as bar C, extend from the top of the gate only a part of the way to the ground, leaving space for hogs, sheep, and other small stock to pass under. The lower end of upright bar C rests on the top of a block, H, which is secured to the gate-post A' by a device or devices which will allow adjustment of said block to compensate for the settling of said gate-post or any change of position of said block. A bolt, $h$, passing through a vertical slot, $h'$, in said block and entering said post A', is preferably used for this purpose. On the top of this block H is formed a rib, H', which enters a corresponding recess, $c$, in the bottom of upright bar C, and thereby locks the latter and the gate against accidental swinging motion.

Each upright bar B C may be formed of a single piece; but we prefer to construct each of them of two opposite strips or battens, between which the ends of the slats or rails E are fastened. When thus constructed the lower end of post C consists of the lower ends of its two battens extending below the lowest of the slats or rails E, and the recess $c$ is simply the space between them and below said rail.

The vertically-movable part of the gate consists of the standard D aforesaid, a front standard, D', and the horizontal slats or rails G, which extend across from one to the other of said standards at the lower part thereof. When dropped into its lowest position this vertically-movable part of the gate closes the space below the vertically-immovable part already described. By the devices hereinafter described both ends or either end of this movable part of the gate may be adjusted to any height desired within obvious limits.

The front upright standard, D', straddles the rails or slats E of the upper part of the gate, and is free to move over them, internal stops at the top and bottom of said standard preventing it from separating altogether from said upper and vertically-immovable part. A U-shaped supporting-link, I, is hung from the upper end of standard D' and adapted to engage with any one of a series of notches, $e$, in the top of upper slat, E. Of course the distance of the particular notch thus engaged from standard D' will determine the height at which the front end of the vertically-movable part of the gate will be adjusted. To lessen the exertion necessary for raising this end of the gate, we employ a counterbalance-lever, J, of the first kind, which is provided with a weight, $j$, on its rear tapering end, and has its forward end arranged to come in contact with the under side of a stud, $D^2$, on the side of standard $D'$. The weight $j$ thus tends to raise the forward end of said vertically-movable part of the gate. The pivot of this lever is on a stud or screw, $l$, projecting from or screwed into an upright batten, L, fastened to slats E. The tapering shape of the rear end of said lever allows weight $j$ to be readily removed therefrom, though a secure attachment of it is easily effected.

The rear standard, D, consists of an upright strip, guided as above described, and provided with a stop, $d$, at top and bottom to prevent separation from the vertically-immovable part of said gate. In this strip there are at intervals holes $d'$, which are made to register with a corresponding hole in one of the slats or rails E. A pin, M, is adapted to pass through any one of said holes $d'$ into said hole in said slat. By removing the pin, raising or lowering the standard D until the proper upper or lower hole M comes opposite the hole in the slat, and then reinserting the pin, it is evident that the rear end of the movable part of the gate may be readily adjusted to and locked at any desired elevation.

As there are no other attachments than those named between the vertically-movable and the vertically-immovable parts of the gate, we are enabled, by means of the adjusting devices above described, to regulate the inclination and elevation of the lower part of the gate so as to conform to any slant or inequality of the ground, or to avoid any drift of snow, or to allow the passage of small stock through either end of the gate or at any part of its lower portion, the upper portion still remaining stationary.

Having thus described our invention, what we claim as new, and desire to secure by Letters Patent, is—

1. In combination with the vertically-immovable upper part of the gate, the vertically-movable lower part, having the standard $D'$, and a supporting-link attached to said standard and adapted to drop into any one of a series of notches in said immovable part, substantially as set forth.

2. The counterbalance-lever J and weight $j$, in combination with vertically-movable standard $D'$, having stud $D^2$, the vertically-immovable slats E, embraced by said standard, and adjustable supporting devices for said standard, operating substantially as and for the purpose set forth.

3. In combination with gate-post $A'$ and upright bar C, having recess $c$ in its bottom, the vertically-adjustable block H, having on its top a rib adapted to enter said recess.

4. A gate having a vertically-immovable upper part and a lower part which is independently adjustable vertically at either end, the adjustment of the rear end being effected by means of a pin, a series of holes in the rear upright bar, D, and a hole in one of the slats $e$, substantially as set forth.

In testimony whereof we affix our signatures in presence of two witnesses.

ANTHONY ISKE.
ALBERT ISKE.

Witnesses:
P. DONNELLY,
CLARENCE DONNELLY.